US008715389B2

(12) United States Patent
Choi et al.

(10) Patent No.: US 8,715,389 B2
(45) Date of Patent: May 6, 2014

(54) CO-CURRENT AND COUNTER CURRENT RESIN-IN-LEACH IN GOLD LEACHING PROCESSES

(75) Inventors: Yeonuk Choi, Oakville (CA); Samir Chefai, Milton (CA)

(73) Assignee: Barrick Gold Corporation (CA)

( * ) Notice: Subject to any disclaimer, the term of this patent is extended or adjusted under 35 U.S.C. 154(b) by 6 days.

(21) Appl. No.: 13/313,594

(22) Filed: Dec. 7, 2011

(65) Prior Publication Data

US 2012/0183433 A1    Jul. 19, 2012

Related U.S. Application Data

(60) Provisional application No. 61/420,596, filed on Dec. 7, 2010.

(51) Int. Cl.
  *C22B 3/04*    (2006.01)
  *C22B 11/00*   (2006.01)

(52) U.S. Cl.
  USPC .................... 75/744; 75/732; 75/733; 75/736

(58) Field of Classification Search
  USPC .......................................... 75/722
  See application file for complete search history.

(56) References Cited

U.S. PATENT DOCUMENTS

| 4,758,413 | A  | * | 7/1988 | Harris et al. ................... 423/24 |
| 5,385,668 | A  |   | 1/1995 | Greenhalgh et al. |
| 2008/0105088 | A1 | * | 5/2008 | Ji et al. ........................ 75/744 |

OTHER PUBLICATIONS

Coetzee et al. "Counter-current vs co-current flow in carbon-in-pulp adsorption circuits." Minerals Engineering, Apr. 1999, vol. 12, No. 4, pp. 415-422.
International Search Report and Written Opinion for International (PCT) Patent Application No. PCT/IB2011/003096, mailed May 2, 2012 7 pages.
International Preliminary Report on Patentability for International (PCT) Patent Application No. PCT/IB2011/003096, mailed Jun. 20, 2013 5 pages.

* cited by examiner

*Primary Examiner* — Roy King
*Assistant Examiner* — Xiaowei Su
(74) *Attorney, Agent, or Firm* — Sheridan Ross PC

(57) ABSTRACT

A method and system are provided in which a gold and/or silver-collecting resin-in-leach circuit comprises both co-current and counter-current sections.

30 Claims, 7 Drawing Sheets

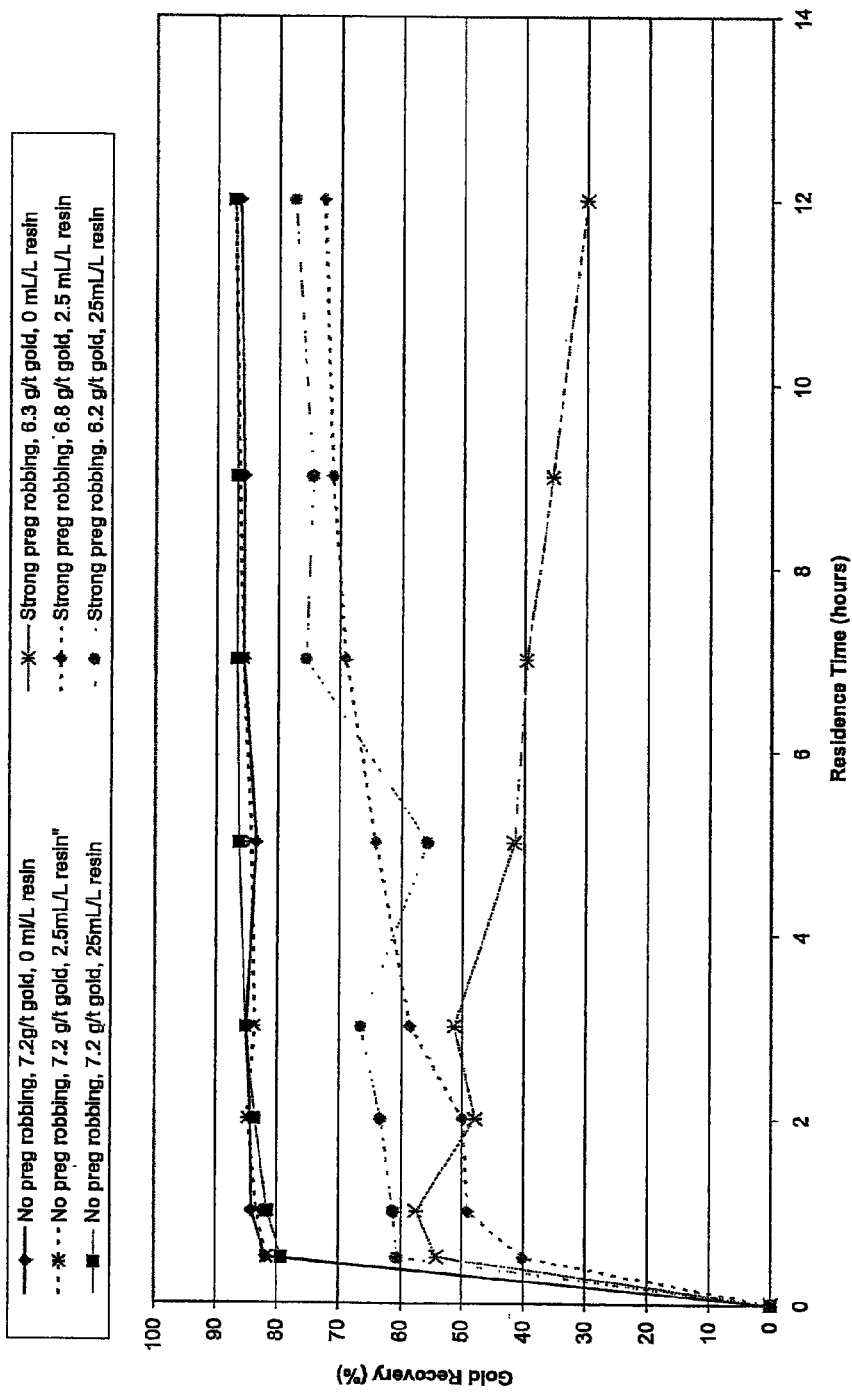
Figure 4: Effect of Resin Concentration on Gold Recovery in Preg Robbing and Non Preg Robbing Ores

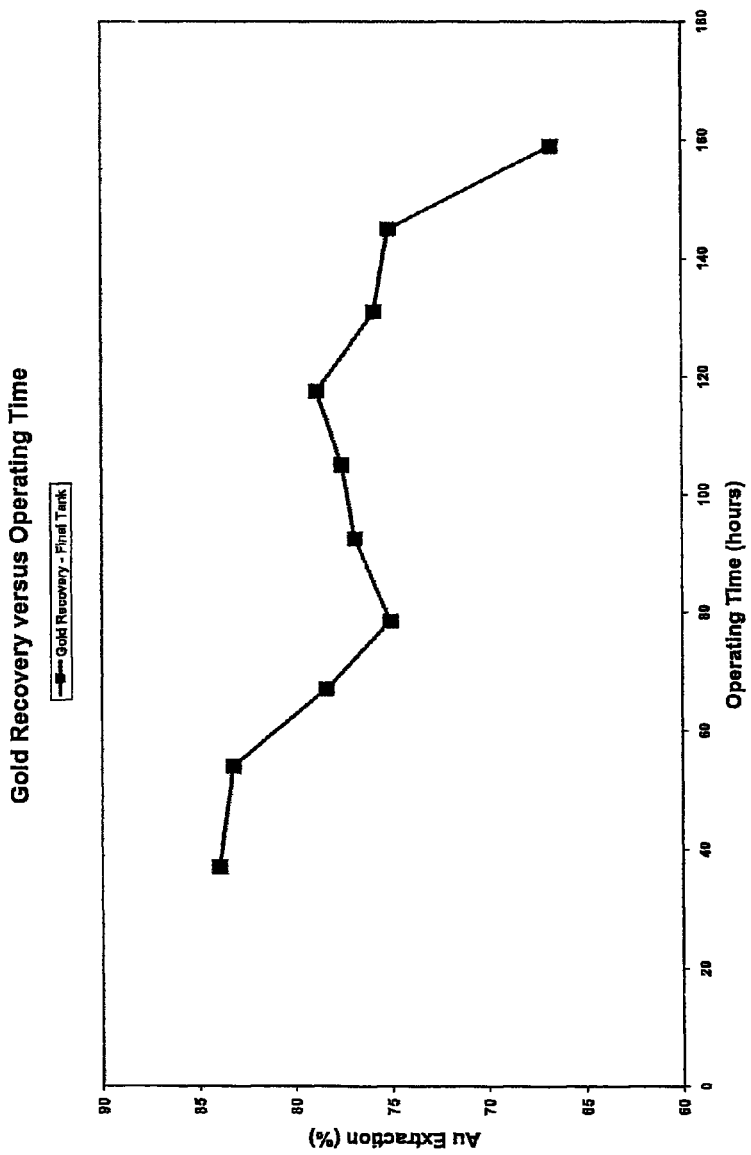
Figure 5: Gold Recovery vs Operating time in counter current RIL circuit operated at steady state

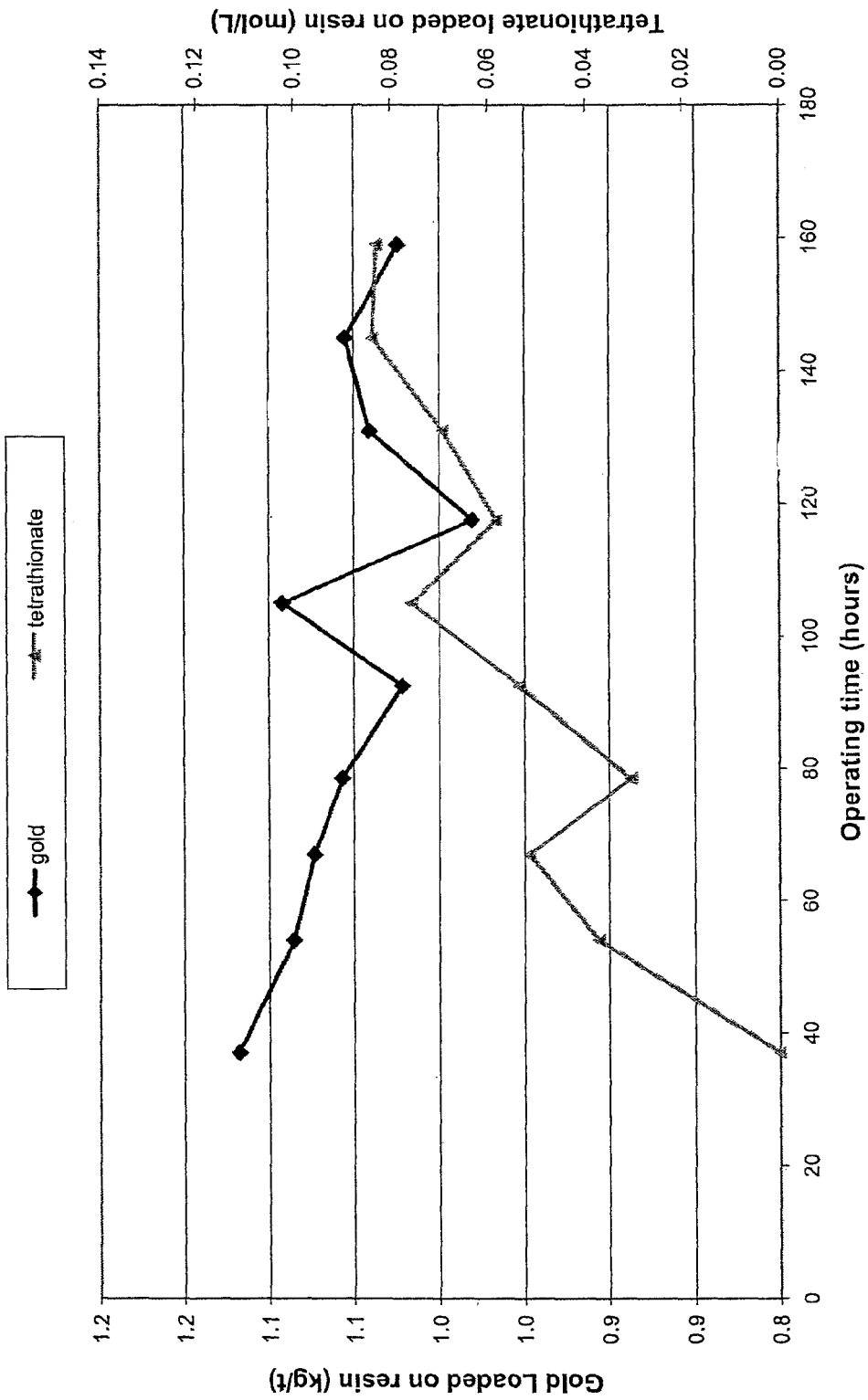
Figure 6: Relationship between tetrathionate adsorption and gold recovery

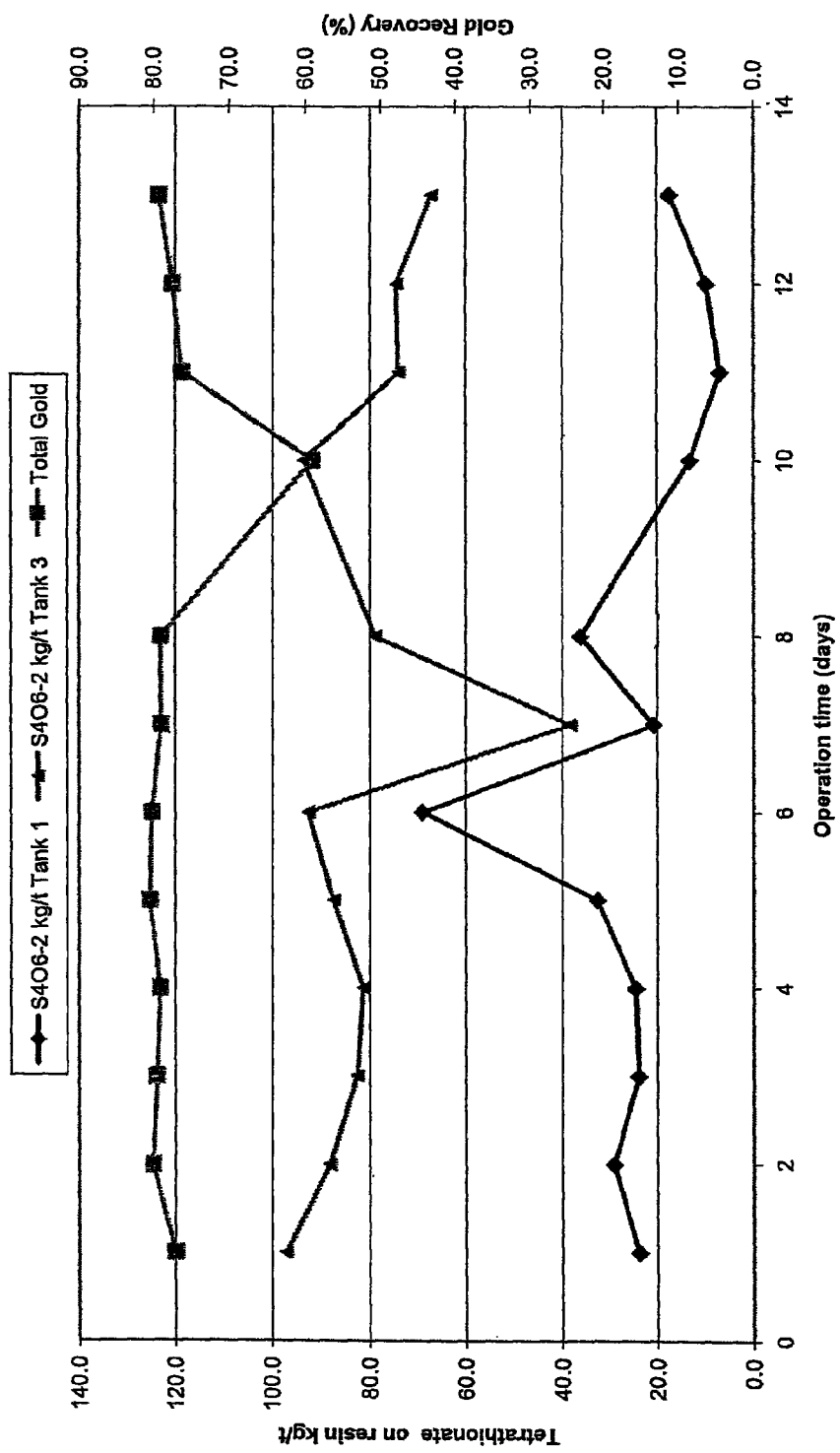
Figure 7: Two Phase co-current counter current operation of RIL circuit showing the tetrathionate levels in tanks 1 and 3 and Total Gold Recovery.

CO-CURRENT AND COUNTER CURRENT RESIN-IN-LEACH IN GOLD LEACHING PROCESSES

CROSS REFERENCE TO RELATED APPLICATION

The present application claims the benefits of U.S. Provisional Application Ser. No. 61/420,596, filed Dec. 7, 2010, entitled "Use of Co-Current and Counter Current Resin In Leach to Improve Gold Recovery in Thiosulfate Leaching", which is incorporated herein by this reference in its entirety.

FIELD

The disclosure relates generally to hydrometallurgical processes for recovering gold and/or silver and particularly to hydrometallurgical processes for recovering gold.

BACKGROUND

Referring to FIG. 1, a conventional gold recovery process is depicted.

A refractory or double refractory sulfidic gold and/or silver-containing material 100 is subjected to pressure oxidation, such as in an autoclave, in step 104 to form an oxidized output slurry 108, that includes a gold and/or silver-containing residue.

The oxidized output slurry 108 is hot cured in optional step 112 to convert basic iron sulfate and free sulfuric acid to dissolved ferric sulfate and form a hot cured slurry 116.

In step 120, the hot cured slurry 116 is optionally subjected to liquid/solid separation, such as by a counter current decantation circuit, to form a washed slurry 124.

The washed slurry 124 is subjected to neutralization in step 128, typically by a weaker base such as alkali or alkaline earth metal oxides and carbonates, to neutralize most of the acid and acid equivalents in the washed slurry 124 and form neutralized slurry 132.

The neutralized slurry 132 is preconditioned in step 136 by contact with sparged air and a strong base, particularly lime, to form a preconditioned slurry 140 having a pH of about pH 8 or higher.

In step 144, the preconditioned slurry 140 is subjected to a gold and/or silver resin-in-leach process in the presence of a gold and/or silver lixiviant, such as thiosulfate, to load onto the resin the gold and/or silver in the residue. The loaded resin can be stripped and the stripped gold and/or silver recovered as a gold and/or silver product 148.

FIG. 2 depicts a conventional counter-current resin-in-leach (or resin-in-pulp) circuit 200 of the type used in step 144. The circuit 200 includes a plurality of first, second, third, . . . nth tanks 208a-n. The fresh resin 204, which is typically a strong-base anion exchange resin, is first contacted with the slurry 140 containing the lowest amount of dissolved gold, providing a driving force to promote the leaching of gold from the residue and adsorption of the dissolved gold. The gold and/or silver loaded resin 212 is removed from the first tank 208a, and barren tailings 216 are removed from the nth tank 208n.

Although this process can be effective in recovering gold and/or silver, gold and/or silver recoveries can be problematic. Use of the resin-in-leach or resin-in-pulp method is generally limited to those gold and/or silver-bearing ores or concentrates requiring mild thiosulfate leaching conditions, since strong thiosulfate leach conditions can result in competitive adsorption on the resin by polythionate anions (e.g., tetrathionate and trithionate) produced during leaching. By way of example, tetrathionate and trithionate concentrations of 420 and 350 mg/L, respectively, have been found to reduce gold loading onto a Purolite™ A500C resin by an order of magnitude; that is, from 26 to 2 kg Au/t resin from a solution containing 0.3 mg/L Au. A typical concentration of tetrathionate and other higher polythionates in a thiosulfate leach solution ranges from about 50 to about 200 mg/L and of trithionate ranges from about 275 to about 375 mg/L.

To counter this problem, sulfite has been added to pregnant thiosulfate leach solutions in an oxygen-free atmosphere (e.g., using a nitrogen purge) to counteract the detrimental effect of polythionate concentration. Although effective, this approach can add additional expense to the process.

SUMMARY

These and other needs are addressed by the various aspects, embodiments, and configurations of the present disclosure. The present disclosure is directed generally to gold and/or silver leaching using a resin-in-leach or resin-in-pulp circuit.

In a first embodiment, a method includes the step of:
leaching, by thiosulfate, a gold and/or silver-containing material in a resin-in-leach or resin-in-pulp circuit, the circuit comprising a co-current portion where the gold and/or silver-containing material and a gold and/or silver-collecting resin flow co-currently and a counter-current portion where the gold and/or silver-containing material and gold and/or silver-collecting resin flow counter-currently.

In a second embodiment, a method includes the step of:
thiosulfate leaching, by a resin-in-leach or resin-in-pulp circuit, a gold-containing material, the circuit comprising a co-current portion where the gold-containing material and an ion exchange resin flow co-currently and a counter-current portion where the gold and/or silver-containing material and ion exchange resin flow counter-currently. The solutions used to strip gold from the gold-loaded resin and to convert tetrathionate and other higher polythionates to trithionate are commonly different and the operations are done in separate steps.

In a third embodiment, a system includes:
a first set of tanks configured to flow co-currently an ion exchange resin, thiosulfate, and a gold and/or silver-containing material, the first set of tanks comprising a first input for a first inputted ion exchange resin and a first output for a first gold and/or silver-loaded resin; and
a second set of tanks for receiving the thiosulfate and gold and/or silver-containing material from the first set of tanks and being configured to flow counter-currently a second inputted ion exchange resin on the one hand and the thiosulfate and gold and/or silver-containing material on the other. The second set of tanks includes a second input for a second inputted resin and a second output for a second gold and/or silver loaded resin. The first and second inputted ion exchange resins are different from one another, and the first and second gold and/or silver-loaded resins are different from one another. In one configuration, the second gold and/or silver-loaded resin is introduced into the first input as part of the first inputted ion exchange resin.

The co-current and counter-current portions can have many configurations. In one configuration, the co-current and counter-current portions do not share a common resin-in-leach or resin-in-pulp tank. Typically, the gold and/or silver-containing material flows first through the co-current portion and second through the counter-current portion. Most (or all) of the gold and/or silver-loaded resin in the co-current portion is removed from the co-current portion and most (or all) of a gold and/or silver-loaded resin in the counter-current portion is removed from the counter-current portion. In one configuration, the co-current and counter-current portions share a common vessel. Stated another way, most (or all) of the gold and/or silver-loaded resin in the co-current portion and most (or all) of the gold and/or silver-loaded resin in the counter-current portion are removed from a common tank.

Commonly, a first resin concentration in a part of the co-current portion is greater than a second resin concentration in a part (or all) of the counter-current portion. An average and median resin concentration in the co-current portion is typically greater than a respective average and median resin concentration in the counter-current portion. Stated another way, a maximum resin concentration in the co-current portion exceeds a maximum resin concentration in the counter-current portion, and a minimum resin concentration in the co-current portion exceeds a minimum resin concentration in the counter-current portion.

However in other applications, a first resin concentration in a part of the co-current portion is less than a second resin concentration in a part (or all) of the counter-current portion. An average and median resin concentration in the co-current portion can be less than a respective average and median resin concentration in the counter-current portion. Stated another way, a maximum resin concentration in the co-current portion does not exceed a maximum resin concentration in the counter-current portion, and a minimum resin concentration in the co-current portion does not exceed a minimum resin concentration in the counter-current portion. By way of example, a first resin concentration in a first tank of the co-current portion is lower than the resin concentrations in one or more other tanks in the counter-current portion.

In many leach circuits, the thiosulfate is substantially or completely free of ammonia.

In one configuration, most (or all) of polythionate- and gold and/or silver-loaded resin from the counter-current portion is treated to convert most of the higher polythionates to trithionate using a first solution but most (or all) of the gold and/or silver remains loaded on the resin to form a treated gold and/or silver-loaded resin. In one application, pentathionate and/or other higher polythionates sorbed on the resin are treated with sulfite, which converts tetrathionate, pentathionate and/or other higher polythionates into trithionate and thiosulfate. High levels of sorbed tetrathionate and other higher polythionates on the gold and/or silver-loaded resin can increase significantly tetrathionate and other higher polythionate levels in the co-current portion. Trithionate is not as strongly sorbed onto the resin as pentathionate and tetrathionate and, compared to higher polythionates, is significantly less likely to precipitate gold and/or silver from solution and inhibit gold and/or silver adsorption on the resin. The treated gold and/or silver-loaded resin is introduced into the first input of the co-current portion. The treated gold and/or silver-loaded resin is loaded with more gold and/or silver in the co-current portion to form further gold and/or silver-loaded resin, and the further gold and/or silver-loaded resin is removed from the co-current portion and subjected to gold and/or silver stripping using a second (stripping) solution to remove most (or all) of the gold and/or silver from the further gold and/or silver-loaded resin and form a gold and/or silver-stripped resin. The gold and/or silver-stripped resin can be regenerated and reintroduced into the counter-current portion. This configuration is typically employed where the adsorbed level of tetrathionate and other higher polythionates on the treated gold and/or silver-loaded resin from the counter-current portion is relatively high. For example, the configuration would be appropriate when the adsorbed polythionates are predominantly in the form of tetrathionate and other higher polythionates.

In one configuration, the gold and/or silver-loaded resin from the counter-current portion is introduced from the second output directly into the first input of the co-current portion without intermediate treatment to remove tetrathionate and other higher polythionates from the resin. This configuration is employed when the levels of adsorbed tetrathionate and other higher polythionates are relatively low. For example, the configuration would be appropriate when the adsorbed polythionates are predominantly in the form of trithionate.

In one configuration, the gold and/or silver-loaded resins from the counter-current and co-current portions are subjected to separate the resin treatment (for higher polythionate conversion) and/or gold and/or silver-stripping stages.

In one configuration, the gold and/or silver-loaded resins from the counter-current and co-current portions are subjected to common treatment and/or gold and/or silver-stripping stages.

All, some, or none of the stripped resin can be regenerated for reuse in either or both of the co-current and counter-current portions.

The present disclosure can provide a number of advantages depending on the particular configuration. The circuit can promote fast gold and/or silver adsorption kinetics from the slurry at the front end of the circuit and prevent gold and/or silver loss by preg robbing and other gold and/or silver-recovery-reducing mechanisms. By adding resin in a co-current flow to the first tank, there commonly are no interfering compounds, which reduce resin loading, from subsequent leach tanks being transferred to the tanks at the beginning of the circuit. The resin added to the first tank is normally retained in the second tank until the concentration builds up. Allowing the resin concentration to build in the second tank can substantially minimize the effects of changes in the composition of gold and/or silver-containing material. The circuit can recover gold and/or silver effectively from gold and/or silver-bearing ores or concentrates requiring not only mild but also strong thiosulfate leaching conditions. In addition, the detrimental effects of polythionate anions (e.g., tetrathionate and other higher polythionates with tetrathionate being more detrimental) on gold and/or silver recovery can be largely negated by the circuit.

These and other advantages will be apparent from the disclosure of the aspects, embodiments, and configurations contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "higher polythionate" refers to a compound comprising $S_n(SO_3)_2]^{2-}$, where n ≥4. "Higher polythionates" therefore includes tetrathionate, pentathionate, hexathionate, and so on.

The term "ion exchange resin" or "ion-exchange polymer" is an insoluble matrix (or support structure) normally in the form of small (0.25-2 mm diameter) beads fabricated from an organic polymer substrate, such as crosslinked polystyrene or polystyrene-divinyl benzene copolymers. The material has a highly developed structure of pores or functional groups (such as amines and esters on the surface), which easily trap and release ions. The adsorption of ions takes place only with simultaneous releasing of other ions; thus the process is called ion exchange. Functional groups can be basic (anion exchangers) or acidic (cation exchangers), with strong- and weak-base resins being preferred.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

A "polythionate" is a salt or ester of a polythionic acid.

The phrase "preg robbing carbon" refers to a carbonaceous material that preferentially absorbs, permanently or temporarily, gold and gold-thio complexes and silver and silver-thio complexes.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 4 is a plot of gold recovery (percent) (vertical axis) against residence time (hours) (horizontal axis);

FIG. 5 is a plot of gold extraction (percent) (vertical axis) against operating time (hours) (horizontal axis);

FIG. 6 is a plot of gold loaded on resin (kg/t) (left vertical axis) against operating time (hours) (horizontal axis) and a plot of tetrathionate loaded on resin (mol/L) against operation time (hours) and;

FIG. 7 is a plot of gold loaded on resin (%) (right vertical axis) against operating time (days) (horizontal axis) and a plot of tetrathionate loaded on resin (kg/t) (left vertical axis) against operation time (days).

DETAILED DESCRIPTION

FIG. 4 depicts phenomena that can occur when performing thiosulfate gold and/or silver leaching with and without an ion exchange resin. First, the majority of gold is commonly leached from the gold-containing material quickly. Second when the gold-containing material is substantially free of preg-robbing components, the gold is commonly leached from the material quickly and almost completely. Leaching kinetics do not appear to be affected by the presence or absence of an ion exchange resin. Third when the gold-containing material contains a preg robbing component, the leaching kinetics are commonly slower, and the initial leaching kinetics and overall gold recovery are improved when the resin is present. Finally when the gold-containing material contains a preg robbing component and the resin is not present during leaching, the initial leaching kinetics are commonly high but the gold recovery commonly decreases over time. The decrease in recovery is most likely due to the adsorption of the gold thiosulfate complex by the preg-robbing material. As shown in FIG. 4, fast adsorption of gold in solution can prevent subsequent losses in recovery by preg-robbing.

Feed to gold recovery circuits can exhibit great variability which can also adversely affect gold recovery. In addition to the effect of preg robbing shown above, gold concentration, and the presence of other metals, which can complex with thiosulfate and be adsorbed by the resin, can also affect leaching kinetics and recoveries.

Thiosulfate is partially oxidized under the conditions required for gold leaching and its oxidation products can compete with gold and/or silver thiosulfate complexes for functional group sites. The oxidation products include trithionate ($S_3O_6$), tetrathionate ($S_4O_6$), pentathionate ($S_5O_6$), other higher polythionates, and sulfate ($SO_4^{2-}$), and these oxidation products can be adsorbed by the resin. The relative affinities for various compounds adsorbed by strong base anion exchange resins are:

Gold>Mercury>Pentathionate>Tetrathionate>Copper>Trithionate.

Typical concentrations of polythionates in the slurry 140 range from about 0.1 to about 5 g/L and even more typically from about 0.5 to about 2 g/L.

Figure 1:
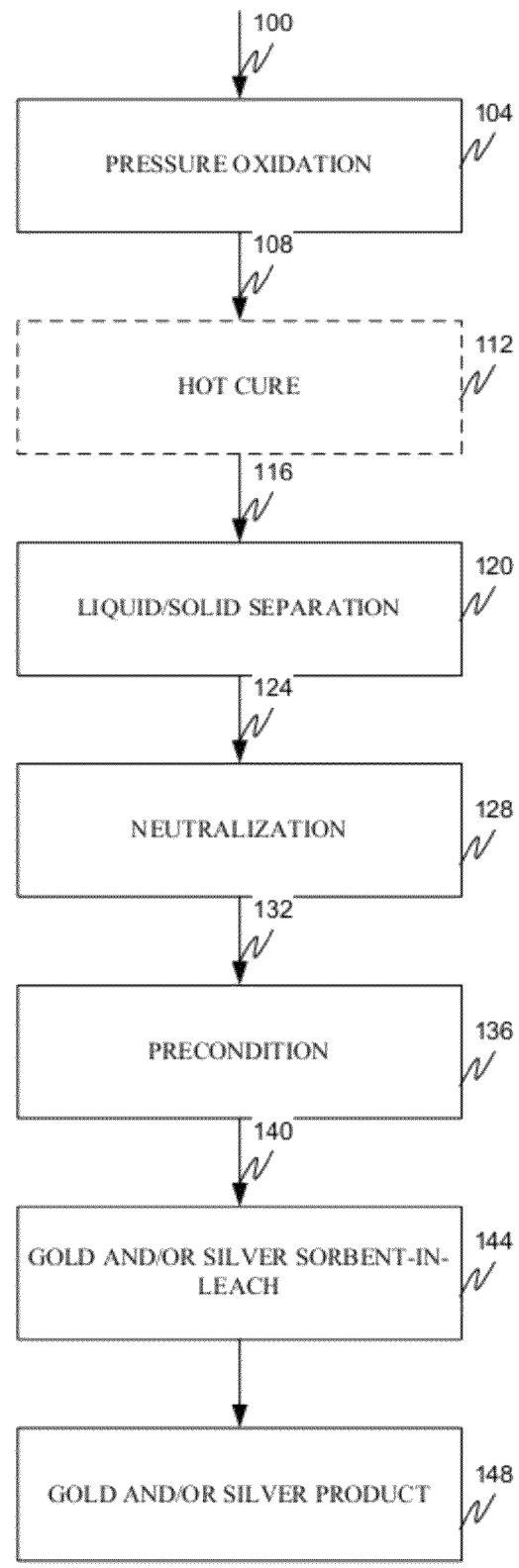
FIG. 1 is a process flow chart according to the prior art.
Figure 2:
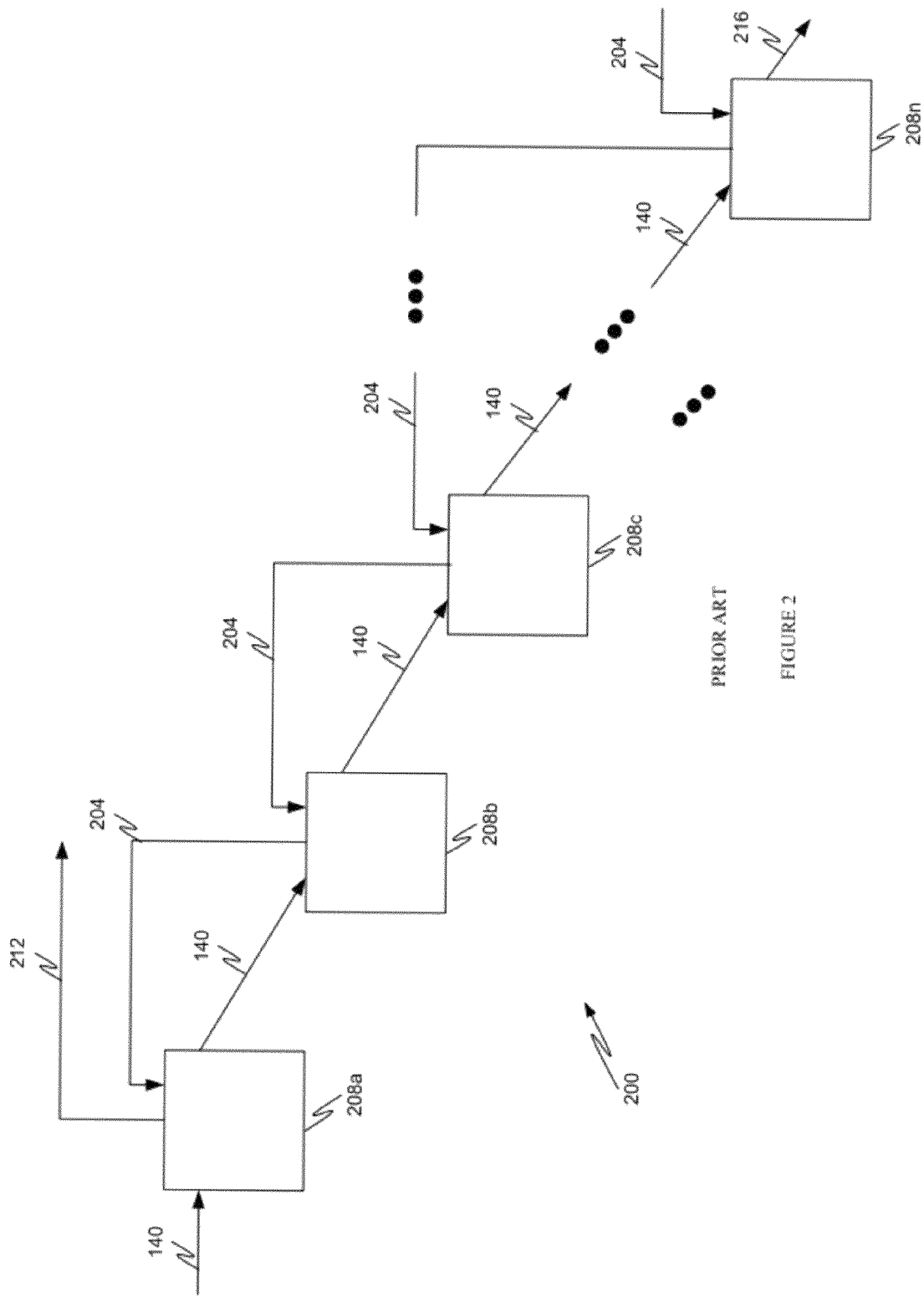
FIG. 2 is a resin-in-leach circuit according to the prior art.

With reference to the conventional circuit 200 of FIG. 2 as the resin 204 is transferred towards the slurry feed end of the circuit 200, the gold level on the resin 204 increases, however the level of other components, particularly trithionate, tetrathionate and/or other higher polythionates, which, as noted, have an affinity for the resin, will also increase. By the time the resin 204 reaches the first tank 208a, which is where the majority of the gold (and/or silver) thiosulfate complex is typically formed (or the majority of gold (and/or silver) is dissolved), the resin 204 may not have adequate adsorption capacity to adsorb the gold (and/or silver), thereby lowering gold recoveries.

To minimize substantially the effects of changes in feed characteristics on gold recovery, it appears, based on the results shown in FIG. 4, to be advantageous to operate a thiosulfate resin-in-leach operation employing a high concentration of resin during the earliest stages of gold leaching. This can ensure that there is an abundance of adsorption or functional sites on the resin to adsorb the gold (and/or silver) prior to preg robbing or the occurrence of other species competing with gold (and/or silver) thiosulfate complex for resin functional groups.

Figure 3:
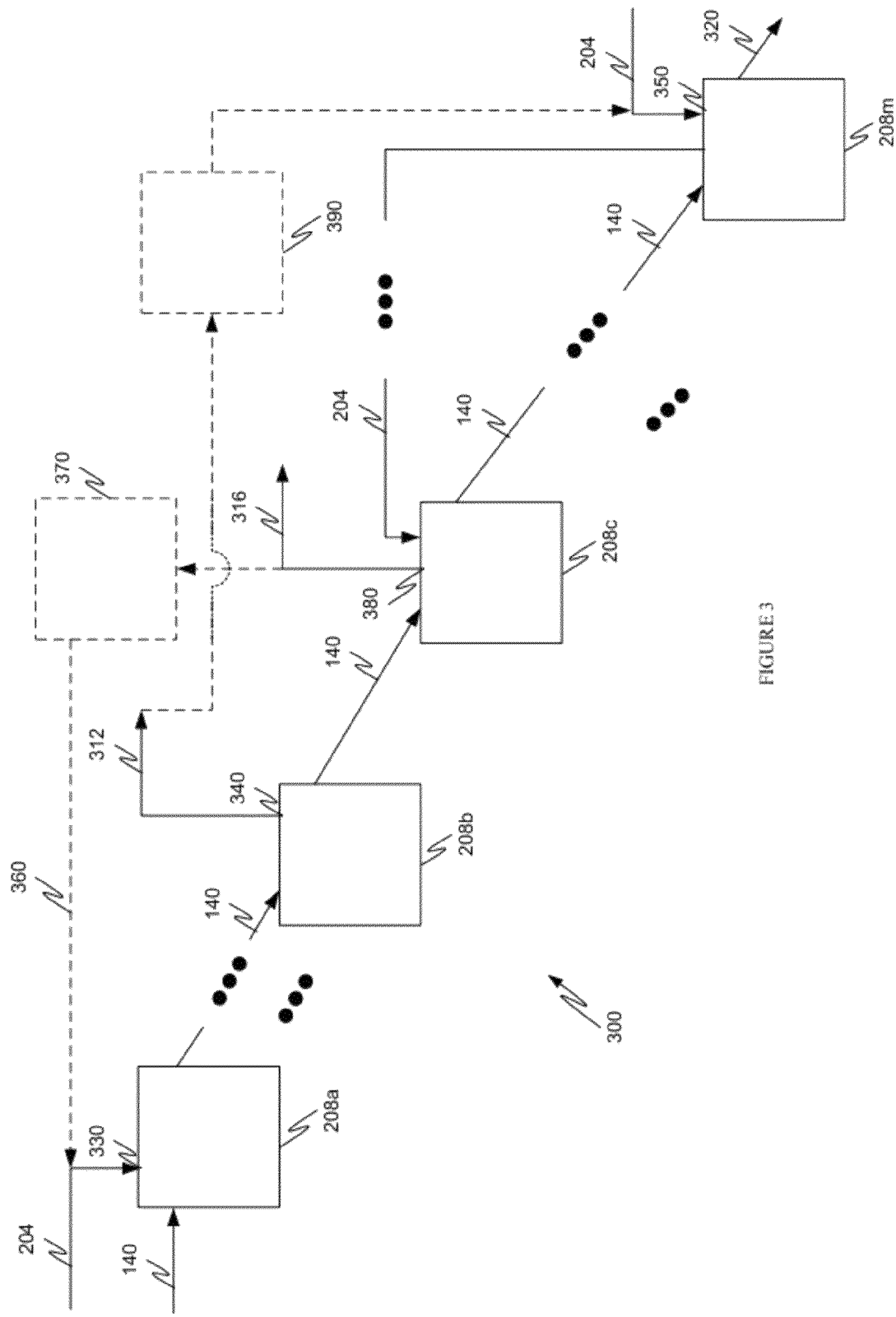
FIG. 3 is a resin-in-leach circuit according to an embodiment.

An embodiment of a resin-in-leach circuit according to the present disclosure is shown in FIG. 3.

FIG. 3 depicts a resin-in-leach 300 (or resin-in-pulp) circuit 300, which includes a plurality of first, second, third, ... mth tanks 208a-m. The first, second, third, ... mth tanks 208a-m are typically air-agitated (e.g., Pachuca-type) vessels to maintain resin and slurry well mixed and provide air-lift for resin-slurry transfer into and out of the tanks. Static sieve bend screens (DSM type) are used to separate the resin from the slurry 140. Fresh resin 204 (and/or partially gold and/or silver loaded resin 204 from one or more of tanks 208c-m and/or stripped and/or regenerated resin from a first output 340), which is a strong-base anion exchange resins and more typically Purolite™ A500C, is contacted, via a first input 330 with the slurry 140 in the first tank 208a containing the highest amount of gold (and/or silver) (among the first, second, third, ... mth tanks) and with the slurry 140 in the final tank 208m containing the lowest amount of gold (and/or silver) (among the first, second, third, ... mth tanks). The resin 204 added to the first tank 208a moves co-current with the slurry 140, and gold (and/or silver) loaded resin 312, typically containing most of the gold (and/or silver) in the leached gold (and/or silver)-containing material is removed, via a first output 340, from the second tank 208b (hereinafter "the co-current portion of the circuit"). The resin 204 added, via a second input 350, to the final tank 208m moves counter-current to the slurry 140 and gold (and/or silver) loaded resin 316 is removed, via an output 360, from the third tank 208c (hereinafter "the counter-current portion of the circuit"). Barren tailings 320 are removed from the nth tank 208n, and gold and/or silver- and interferent-loaded resin 316 are removed from second output 380. In various configurations, the resin 204 added to the second input 350 may be gold and/or silver- and/or treated, and/or regenerated resin from the first and/or second outputs 340 and 380 and/or fresh resin.

As will be appreciated, it is not necessary to have only two tanks with resin flowing co-currently. Any number of tanks can be used. For example, it is possible to have only one tank or more than two tanks with an appropriate resin concentration. Multiple tanks are commonly employed to minimize short circuiting of the slurry.

The slurry 140, in one application, has a solids content ranging from about 30 to about 50 vol. %.

In the first tank 208a, the slurry 140 is contacted with a gold (and/or silver) lixiviant, which is preferably an alkaline earth, alkali metal, or ammonium thiosulfate, dilution water, and optionally copper (typically as copper sulfate). In one application, the slurry 140 is contacted with sufficient thiosulfate to yield a thiosulfate concentration in the slurry 140 ranging from about 0.005 to about 2 molar. Preferably, copper, when present, is added to the feed slurry at a concentration ranging from about 10 to about 100 ppm, more preferably from about 25 to about 100 ppm, and more preferably of about 50 ppm. Copper addition may not be required when a sufficient level of copper from the gold (and/or silver)-containing material leaches into the slurry. Although the exact mechanism of how copper improves the leaching is not well understood, copper is believed to accelerate thiosulfate leaching kinetics. Preferably, there is little, or no, ammonia in the system.

The leaching conditions can vary. Preferably, the temperature of leaching ranges from about 40° C. to 80° C., more preferably from about 40 to about 60° C., with the more preferred target being about 50° C. Higher temperatures may result in excessive resin degradation. Preferably, pH in the leaching is maintained at about pH 7.5 to pH 10, more preferably from about pH 7.5 to about pH 9, with a more preferred target of about pH 8.0. Preferably, the oxidation-reduction-potential ("ORP") (with respect to the Ag/AgCl reference electrode) in leaching is in the range of about −100 mV to +50 mV, though this may vary depending on the type of ores being leached. Commonly, the slurry residence ranges from about 1 to about 5 hours/tank and more commonly from about 3 to about 4 hours/tank. The total slurry residence time for the circuit typically ranges from about 10 to about 25 hours.

The resin contacted with the slurry in the first tank is typically added at a rate of from about 1 to about 3 L/hr. The resin is typically allowed to build up in the second and third tanks 208b-c to a concentration ranging from about 10 to about 25 g/L and more typically from about 12.5 to about 17.5 g/L of slurry.

The first and second tanks 208a-b are typically highly oxygenated while the third ... mth tanks 208c-m (in which the resin flows counter-currently) are typically poorly oxygenated. In one application, the first and second tanks 208a-b commonly have a dissolved molecular oxygen content of at least about 5 ppm and more commonly ranging from about 6 to about 10 ppm while the third ... mth tanks 208c-m have a dissolved molecular oxygen content of less than about 5 ppm and more commonly ranging from about 1 to about 4 ppm.

In one configuration, gold (and/or silver)-loaded resin from the second and third tanks 208b and c is stripped of gold and/or silver with suitable stripping agents, including, for example, halide salts (e.g., sodium chloride, a perchlorate, and the like), polythionate, a nitrate, a thiocyanate, a thiourea, a mixture of sulfite and ammonia, thiosulfate, and mixtures thereof. The gold (and/or silver)-containing stripping agent may be processed by any suitable gold (and/or silver) recovery technique, such as electrowinning or precipitation, to extract the dissolved or stripped gold (and/or silver) and form the gold (and/or silver) product. Elution is normally conducted at a pH ranging from about pH 7 to pH 9 to eliminate substantially osmotic shock on the resin.

In one process configuration, gold (and/or silver)-loaded resin removed from the third tank 208c is treated in unit operation 370 with a sulfite solution to remove most, if not all of, deleterious polythionates (particularly penta and tetrathionate) and the treated gold (and/or silver)-loaded resin 360 is added to the first tank 208a as a partially gold (and/or silver) loaded resin. Other sulfur and sulfoxy agents may be used to remove deleterious polythionates from the gold (and/or silver) and inferent-loaded resin to increase gold (and/or silver) loading without transferring penta- and tetra-thionate interferents. For example, a polysulfide other than a bisulfide, a bisulfide, a sulfide other than a bisulfide and a polysulfide, and mixtures thereof may be used to convert tetrathionate, pentathionate and other higher polythionates into thiosulfate. To avoid precipitation of gold (and/or silver) sulfide, however, the conditions should be carefully controlled to maximize thiosulfate formation while substantially minimizing gold (and/or silver) sulfide precipitation. The sulfite, sulfur, or sulfoxy agent converts tetrathionate, pentathionate and other higher polythionates to trithionates while leaving the gold (and/or silver) adsorbed on the resin. The treated gold and/or silver resin is removed from the first output 340, stripped of gold and/or silver in unit operation 390, and re-inputted at the second input 350.

It is to be understood that any number of tanks may, respectively, be in the co-current and counter-current portions of the circuit Although typical resin concentrations are provided herein, it is to be understood that resin concentrations will vary depending upon the amount of gold (and/or silver) leached in the feed material.

The circuit 300 can promote fast gold adsorption kinetics from the slurry at the front end of the circuit and prevent gold loss by preg robbing or other mechanism which reduce gold (and/or silver) recovery. As noted, the circuit operates by adding resin and slurry to the first tank and transferring both co-currently to the second tank, where the resin is removed and the gold (and/or silver) recovered. By adding resin in a co-current flow to the first tank, there are no interfering compounds from subsequent leach tanks being transferred to the tanks at the beginning of the circuit. The resin added to the first tank is retained in the second tank until the concentration builds up. Allowing the resin concentration to build to the second tank can substantially minimize the effects of changes in the ore type. Although two tanks are shown in the co-current portion in the Figures, it is to be understood that any number of tanks may be employed. For example, a single tank would be sufficient, if short circuiting of the slurry can be avoided.

It is to be understood that the current process is not limited to the reduction of gold (and/or silver) recovery due simply to the presence of a preg-robbing carbonaceous material. While not wishing to be bound by any theory, there appear to be several mechanisms at work in a standard resin-in-leach or resin-in-pulp circuit in reducing gold (and/or silver) recovery. It is often not possible to define which mechanism(s) is contributing individually or collectively to gold (and/or silver) loss. The mixed flow process disclosed herein is designed to reduce the influence of tetrathionate, pentathionate, and other higher polythionate loading on the resin, on lowering gold (and/or silver) recovery, as well as on other preg robbing components, such as carbonaceous material, silica, and/or iron oxide.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

FIG. 5 shows the gold recovery from a conventional counter current operation (such as that shown in FIG. 2) that was operated in steady state for a period of 150 hours. The overall gold recovery as determined by the percent of the gold remaining in the tails, decreased as the operating time increased. The gold recovery dropped from 44% to 27.4% or 16.8% in tank 1, and from 84% to 66.8% or 17.2% in tank 8. It is clear that the loss of gold recovery in tank 1 was not compensated for as the slurry passed through the subsequent tanks.

FIG. 6 shows the relationship between tetrathionate adsorbed by the resin and gold recovery. An analysis of the resin removed from the first tank of the counter current operation shows that as the amount of tetrathionate adsorbed to the resin increased as the amount of gold adsorbed decreased, suggesting that adsorption on the resin of non targeted compounds can reduce the recovery of gold. As the resin moves from the back end of the circuit to the front end of the circuit there is an opportunity for these compounds to be carried to the front of the circuit.

In one configuration, six resin-in-leach tanks were used in the circuit 300. Each tank has a preferred individual residence time of about 3-4 hours each for a total preferred leaching residence time of about 10-24 hours. The total number of tanks may be altered depending on the leaching kinetics.

The first and second tanks 208a-b operate with the resin co-current with the movement of the gold bearing slurry. The feed slurry includes about 48% solids, has a flow rate of about 985 lb/hour or 0.201 mt solid/hour, and a dissolved gold concentration of about 2.5 g/mt. Other additives to the first tank include resin at a typical concentration of about 3.37 mol/L, dilution water at a typical rate of about 28 g/hr, calcium thiosulfate at a typical rate of about 5.2 g/hr, and copper sulfate at a typical rate of about 0.6 g/hr. The first and second co-current tanks have a dissolved molecular oxygen level of amount 7-8 ppm while the four counter-current tanks have a dissolved molecular oxygen level of about 2-3 ppm. The resin concentration in the first tank is about 3.37 mol/L and in the second tank about mol/L. Typically, the resin concentration is maintained at about 15 mol/L by removing the resin from the second tank 208b at approximately the same rate it is added to the first tank 208a. Highly loaded resin is withdrawn from the second tank at a rate of about 1.5 L/hr and contains about 705.51 g/mt gold.

The third through sixth tanks operate with about 5 mL/L resin moving counter-current to the movement of the gold-bearing slurry.

The highest level of gold loading typically occurs in the second tank.

The third through sixth tanks operate to scavenge the remaining gold in the gold bearing slurry.

FIG. 7 demonstrates resin transfer in a co-current (tanks 1 and 2) and counter current (tanks 3 through 6) portions of the circuit. The co-current portion can create conditions in which gold recovery does not decrease over time. As can be seen from the graph, the tetrathionate level in tank 1, where the majority of the gold is leached and adsorbed by the resin, is significantly lower than that observed in the third tank, which is the terminus of the counter-current resin transfer.

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
leaching, by thiosulfate, a gold and/or silver-containing material in at least one of an ion-exchange resin-in-leach and ion-exchange resin-in-pulp circuit, the circuit comprising a co-current portion where the gold and/or silver-containing material and a gold and/or silver-collecting ion-exchange resin flow co-currently and a counter-current portion where the gold and/or silver-containing material and gold and/or silver-collecting ion-exchange resin flow counter-currently, wherein the gold and/or silver-containing material flows first through the co-current portion arid second through the counter-current portion.

2. The method of claim 1, wherein the co-current and counter-current portions do not share a common resin-in-leach or resin-in-pulp tank.

3. The method of claim 1, wherein at least most of the gold and/or silver in the co-current portion is collected by the ion-exchange resin in the co-current portion, and wherein at least most of the gold and/or silver in the counter-current portion is collected by the ion-exchange resin in the counter-current portion.

4. The method of claim 1, wherein a first ion-exchange resin concentration in a part of the co-current portion is greater than a second ion-exchange resin concentration in a part of the counter-current portion and wherein in the counter-current portion, polythionate ions on the one hand and gold and/or silver on the other competitively collect on the ion-exchange resin.

5. The method of claim 4, wherein an average and median ion-exchange resin concentration in the co-current portion is greater than a respective average and median ion-exchange resin concentration in the counter-current portion.

6. The method of claim 4, wherein a maximum ion-exchange resin concentration in the co-current portion exceeds a maximum ion-exchange resin concentration in the counter-current portion.

7. The method of claim 4, wherein a minimum ion-exchange resin concentration in the co-current portion exceeds a minimum ion-exchange resin concentration in the counter-current portion.

8. The method of claim 1, wherein the gold and/or silver is gold, wherein the thiosulfate is substantially free of ammonia, wherein a leach solution in the counter-current portion comprises dissolved gold, thiosulfate, and polythionates, wherein the ion-exchange resin collects, from the leach solution, higher polythionates and gold, wherein the gold and/or silver loaded ion-exchange resin is removed from the co-current portion and contacted with sulfite to convert collected polythionates to trithionates to form a treated gold and/or silver-containing ion-exchange resin, wherein the treated gold and/or silver-containing ion-exchange resin is introduced into the counter-current portion to form a further loaded treated gold and/or silver-containing ion-exchange resin, wherein at least most of the gold and/or silver remains collected on the gold and/or silver-containing ion-exchange resin after sulfite contact, wherein the further loaded treated gold and/or silver-containing ion-exchange resin, after removal from the counter-current portion, is contacted with a stripping solution to remove at least most of the gold and/or silver from the treated gold and/or silver-containing ion-exchange resin, to form a stripped ion-exchange resin, wherein the stripped ion-exchange resin is introduced into the co-current portion, and wherein the gold and/or silver-containing material comprises a preg-robbing material.

9. The method of claim 3, wherein most or all of a gold and/or silver-loaded ion-exchange resin in the co-current portion is removed from a tank in the co-current portion and most or all of a gold and/or silver-loaded ion-exchange resin in the counter-current portion is removed from the counter-current portion.

10. The method of claim 1, wherein most or all of a gold and/or silver-loaded ion-exchange resin in the co-current portion and most or all of a gold and/or silver-loaded ion-exchange resin in the counter-current portion are removed from a common tank.

11. The method of claim 8, wherein the gold and/or silver is gold, wherein higher polythionate- and gold-loaded ion-exchange resin from the counter-current portion is treated to remove most or all of the higher polythionate but most or all of the gold remains loaded on the ion-exchange resin to form a treated gold-loaded ion-exchange resin and wherein the treated gold-loaded ion-exchange resin is introduced into the co-current portion.

12. The method of claim 11, wherein the treated gold-loaded ion-exchange resin is loaded with more gold in the co-current portion to form further gold-loaded ion-exchange resin, wherein the further gold-loaded ion-exchange resin is removed from the co-current portion and subjected to stripping to remove most or all of the gold from the further gold-loaded ion-exchange resin and form a gold and/or silver stripped ion-exchange resin.

13. The method of claim 12, wherein the gold and/or silver stripped ion-exchange resin is reintroduced into the counter-current portion.

14. A method, comprising:
thiosulfate leaching, by at least one of a resin-in-leach and resin-in-pulp circuit, a gold-containing material, the circuit comprising a co-current portion in which the gold-containing material and an ion exchange resin flow co-currently and a counter-current portion in which the gold-containing material and ion exchange resin flow counter-currently, the gold-containing material flowing first through the co-current portion and second through the counter-current portion, wherein a gold-loaded ion-exchange resin is stripped of gold and treated to remove a higher polythionate collected on the gold-loaded ion-exchange resin in separate steps using differing solutions.

15. The method of claim 14, wherein the co-current and counter-current portions do not share a common resin-in-leach or resin-in-pulp tank.

16. The method of claim 14, wherein, relative to the flow of the gold-containing material, the co-current portion is located upstream of the counter-current portion.

17. The method of claim 14, wherein a first ion-exchange resin concentration in a part of the co-current portion is greater than a second ion-exchange resin concentration in a part of the counter-current portion.

18. The method of claim 17, wherein an average and median ion-exchange resin concentration in the co-current portion is greater than a respective average and median ion-exchange resin concentration in the counter-current portion.

19. The method of claim 17, wherein a maximum ion-exchange resin concentration in the co-current portion exceeds a maximum ion-exchange resin concentration in the counter-current portion.

20. The method of claim 17, wherein a minimum ion-exchange resin concentration in the co-current portion exceeds a minimum ion-exchange resin concentration in the counter-current portion.

21. The method of claim 14, wherein the thiosulfate is substantially free of ammonia, wherein a leach solution in the counter-current portion comprises dissolved gold, thiosulfate, and polythionates, wherein the ion-exchange resin collects, from the leach solution, higher polythionates and gold, and wherein the gold-containing material comprises a preg-robbing carbonaceous material.

22. The method of claim 16, wherein most or all of a gold-loaded ion-exchange resin in the co-current portion is removed from the co-current portion and most or all of a gold-loaded ion-exchange resin from the counter-current portion is removed from the counter-current portion.

23. The method of claim 14, wherein most or all of a gold-loaded resin in the co-current portion and most or all of a gold-loaded ion-exchange resin in the counter-current portion are removed from a common tank.

24. The method of claim 21, wherein higher polythionate and gold-loaded ion-exchange resin from the counter-current portion is treated to remove of most or all of the higher polythionate but most or all of the gold remains loaded on the ion-exchange resin to form a treated gold-loaded ion-exchange resin and wherein the treated gold-loaded ion-exchange resin is introduced into the co-current portion.

25. The method of claim 24, wherein the treated gold-loaded ion-exchange resin is loaded with more gold in the co-current portion to form further gold-loaded ion-exchange resin, wherein the further gold-loaded ion-exchange resin is removed from the co-current portion and subjected to gold stripping to remove most or all of the gold from the further gold-loaded ion-exchange resin and form a treated gold-stripped ion-exchange resin.

26. The method of claim 25, wherein the treated gold-stripped ion-exchange resin is reintroduced into the counter-current portion.

27. The method of claim 14, wherein a thiosulfate leach solution in the counter-current portion comprises dissolved gold, thiosulfate, and polythionates, wherein the resin collects, from the leach solution, higher polythionates and gold, wherein a partially gold-loaded ion-exchange resin is removed from the co-current portion and contacted with sulfite to convert collected polythionates to trithionates to form a treated gold-containing ion-exchange resin, wherein the treated gold-containing ion-exchange resin is introduced into the counter-current portion to form the gold-loaded ion-exchange resin, wherein most or all of the gold remains collected on the partially gold-loaded ion-exchange resin after sulfite contact, wherein the gold-loaded ion-exchange resin, after removal from the counter-current portion, is contacted with a stripping solution to remove most or all of the gold from the gold-loaded ion-exchange resin, to form a stripped ion-exchange resin, and wherein the stripped ion-exchange resin is introduced into the co-current portion.

28. The method of claim 14, wherein most or all of the gold and/or silver leached from the gold and/or silver-containing material is collected by the ion exchange resin in the co-current portion.

29. The method of claim 14, wherein a dissolved molecular oxygen content of a thiosulfate-containing leach solution in the co-current portion is at least 5 ppm and a dissolved molecular oxygen content of the thiosulfate leach solution in the counter-current portion is less than 5 ppm.

30. The method of claim 14, wherein the higher polythionate is removed by contacting the higher polythionate and gold-loaded ion-exchange resin with sulfite to form the gold-loaded ion-exchange resin, wherein most or all of the collected gold remains on the gold-loaded ion-exchange resin, and wherein most or all of the gold is removed from the gold-loaded ion-exchange resin by contacting the gold-loaded ion-exchange resin with a stripping agent comprising one or more of a halide salt, polythionate, nitrate, thiocyanate, thiourea, a mixture of sulfite and ammonia, and thiosulfate.

* * * * *